United States Patent [19]

Piper

[11] Patent Number: 4,537,687

[45] Date of Patent: Aug. 27, 1985

[54] OPEN GRAVITY BACKWASH FILTER AND METHOD

[75] Inventor: Louis H. Piper, Richmond, Va.

[73] Assignee: Infilco Degremont Inc., Richmond, Va.

[21] Appl. No.: 616,171

[22] Filed: Jun. 1, 1984

[51] Int. Cl.³ .............................................. B01D 23/24
[52] U.S. Cl. .................................... 210/793; 210/275; 210/293
[58] Field of Search ............... 210/792, 793, 275, 277, 210/293, 196

[56] References Cited

U.S. PATENT DOCUMENTS

| | | | |
|---|---|---|---|
| 2,879,891 | 3/1959 | Beohner et al. | 210/277 X |
| 2,879,893 | 3/1959 | Stebbins | 210/277 X |
| 3,134,735 | 5/1964 | Greenleaf, Jr. | 210/275 X |
| 3,502,212 | 3/1970 | Veda | 210/277 X |
| 4,338,202 | 7/1982 | Louboutin | 210/275 X |

*Primary Examiner*—Thomas Wyse

*Attorney, Agent, or Firm*—Carroll F. Palmer

[57] ABSTRACT

Improved open gravity backwash filters have a filter chamber containing a particulate filter bed with drainage space beneath the bed and an effluent channel into which filtered effluent from the drainage space flows at a limited rate during the filter mode of operation. The effluent channel has an outflow weir at a height above the top of the filter bed. There is an influent channel in which the influent liquid level is above the top of the filter bed, a gullet with a floor below the top of the filter bed to receive influent from the influent channel and a waste effluent channel with a floor below the level of the top of the filter bed. During the filtering mode, influent is siphoned from the influent channel into the gullet from where it flows to and through the filter bed. During the backwash mode, filtered effluent is siphoned from the effluent channel into the drainage space to pass upwardly through the filter bed to the gullet and the resulting waste effluent in the gullet is siphoned from the gullet into the waste effluent channel.

8 Claims, 3 Drawing Figures

OPEN GRAVITY BACKWASH FILTER AND METHOD

BACKGROUND OF THE INVENTION

1. Field of the Invention

This invention relates broadly to filter apparatus and methods. More particularly, it concerns open gravity backwash filters and gravity filtering and backwashing methods.

2. Description of the Prior Art

Granular media filters used for the removal of suspended material from water, wastewater, or other fluids have been operated in many modes such as constant pressure, constant rate, constant level, influent flow splitting and variable declining rate filtration (VDRF). Of these, VDRF offers desirable advantages (see the EPA technology transfer seminar publication entitled "Wastewater Filtration Design Considerations" of July 1974, pages 28–32). The present invention provides improvements in VDRF apparatus and methods.

The construction of VDRF filters has taken many forms, the majority of which use valves to control flows during the filtering and backwashing cycles. However, the use of siphons is advantageous because of their simpler mechanical construction and reliability.

Filter apparatus using siphons for flow control is described in U.S. Pat. Nos. 3,134,735; 3,282,432; 3,312,348 and 4,122,013. However, in such apparatus, only influent flow splitting operation is possible limiting the usefulness thereof. A different application of siphons having several unique features in accordance with the present invention retains the advantages of siphons and allows the use of VDRF operation.

The aforesaid EPA publication of page 30, shows the conventional configuration for the VDRF type filter in which the effluent discharge level control weir is below the wash trough necessitating the use of a backwash supply under pressure, usually a pumped supply. However, it is known to have an effluent weir above the wash trough thereby providing without use of pumps the necessary pressure for backwashing (see U.S. Pat. No. 3,771,655). The present invention uses this type of wash pressure in providing new advancements to the filtering art.

OBJECTS

A principal object of the present invention is the provision of new improvements in variable declining rate filtration apparatus and methods.

Further objects include the provision of:

1. New improvements in the use of siphons for flow control in VDRF operations.
2. Open gravity VDRF backwash filter apparatus and methods that do not require the use of pumps to provide the necessary pressure for backwashing.

Other objects and futher scope of applicability of the present invention will become apparent from the detailed description given hereinafter; it should be understood, however, that the detailed description, while indicating preferred embodiments of the invention, is given by way of illustration only, since various changes and modifications within the spirit and scope of the invention will become apparent to those skilled in the art from this detailed description.

SUMMARY OF THE INVENTION

These objects are accomplished, in part, in accordance with the present invention by the provision of an open gravity backwash filter apparatus comprising an open top filter basin defined by a first floor and an enclosure wall that extends vertically upwardly from the floor. A filter compartment is located within the filter basin defined along one side by a first vertical partition and on the remaining sides by at least a portion of the wall of the filter basin. The filter basin may be round or it may be polyhedral formed of a plurality of vertical sections of about the same height.

A gullet is located within the filter basin juxtaposed to the filter compartment. It is defined along one side by the aforesaid first vertical partition and on the remaining sides by at least part of the wall of the filter basin.

A filter bed of particulate material is supported in the filter compartment above the first floor on a perforate horizontal web and there is a drainage space between the first floor and the horizontal web.

In a preferred embodiment, one or more substantially horizontal troughs extend above the filter bed from the first vertical partition into the filter compartment to distribute liquid into the filter compartment from the gullet.

In an alternative embodiment, the height of the first vertical partition may end above the filter bed, but below the filter basin wall, and be equipped with or used as a weir to distribute influent liquid into the filter compartment from the gullet thereby obviating the use of one or more distribution troughs.

An effluent channel is juxtaposed to the filter basin and a conduit connects the filter bed drainage space to the effluent channel for flow of liquid between them. Flow limiting means is associated with the conduit to regulate the volume of liquid flowing through the conduit.

There is a weir in the effluent channel that has a vertical height above the height of the filter bed influent distribution troughs and less than the height of the walls of the filter basin.

An influent channel is juxtaposed to the filter basin defined by a floor and sidewalls. A second vertical transverse partition is in the influent channel with a horizontal top edge of less height than the sidewalls of the influent channel, but of greater height than the effluent channel weir, creating in the influent channel an inlet water seal chamber in which influent liquid will maintain a level above the height of the effluent channel weir.

A waste channel is juxtaposed to the filter basin defined by a floor and sidewalls and there is a vertical overflow baffle in the waste channel that creates in the waste channel an exit water seal chamber in which waste effluent liquid will have a level below the level of liquid in the gullet.

A first siphon that extends above the height of the walls of the filter basin has one end extending into the inlet water seal chamber of the influent channel and its other end extends into the gullet. A second siphon that extends above the height of the walls of the filter basin has one end extending into the exit water seal chamber of the waste channel and its other end extends into the gullet. A third siphon that extends above the height of the effluent channel weir has one end extending into the effluent channel and its other end is connected for flow of liquid from it into the filter bed drainage space.

Ports are in each of the three siphons at approximately their highest point by which the siphons may be primed by application of vacuum of the ports or deactivated by opening of the ports.

The objects of the invention are further accomplished by the provision in a method of removing suspended material from an aqueous suspension thereof by flowing, in a filter mode, the suspension from a gullet on to and through a filter bed of particulate material contained in a filter chamber to produce filtered effluent and in a cleaning mode regeneration of the bed by backwashing the bed thereby producing waste effluent that is passed to a waste channel, the improvement which comprises flowing the filtered effluent in the filter mode into an effluent channel, controlling the height of the filtered effluent in the effluent channel so that it is higher at the completion of the filter mode than the top of the filter bed, providing aqueous suspension to be filtered via an influent channel to a level above the top of the filter bed, siphoning during the filter mode aqueous suspension from the influent channel into the gullet, siphoning during the backwash mode filtered effluent from the effluent channel into the filter chamber beneath the filter bed, and siphoning during the backwash mode waste effluent from the gullet into the waste channel.

In the interest of clarity, the description of this invention has been limited to what is commonly termed a single bay filter. It will be obvious to those skilled in the art that this invention can also be applied to multiple bay filters as well. In these devices, the filter bed is partitioned by dividing walls into separate bays each having its own effluent siphon, but with all bays being served with a common gullet, influent siphon and waste siphon.

BRIEF DESCRIPTION OF THE DRAWINGS

A more complete understanding of the invention may be obtained by reference to the accompanying drawings in which.

DESCRIPTION OF THE PREFERRED EMBODIMENTS

Figure 1:
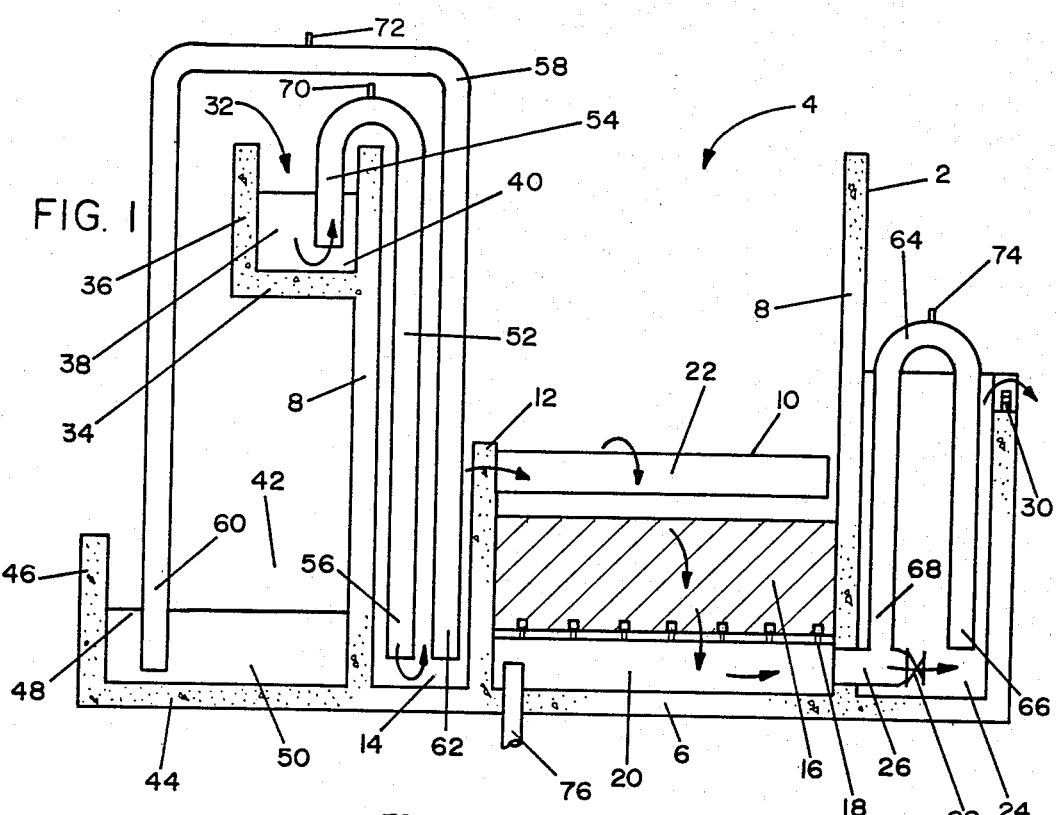
FIG. 1 is a lateral, sectional view of VDRF apparatus constructed in accordance with the invention operating in the filter mode.

Referring in detail to the drawings, the open gravity backwash filter apparatus 2 comprises an open top filter basin 4 defined by a first floor 6 and an enclosure wall 8 that extends vertically upwardly from the floor 6. A filter compartment 10 is located within the filter basin 4 defined along one side by a first vertical partition 12 of less height than the walls 8 and on the remaining sides by at least some of the enclosure wall 8 of the filter basin 4.

A gullet 14 is located within the filter basin 4 juxtaposed to the filter compartment 10. The gullet 14 is defined along one side by the vertical partition 12, on the remaining sides by some of the wall 8 of the filter basin 4 and on the bottom by the floor 6.

A filter bed 16 of particulate material is supported in the filter compartment above the floor 6 on a perforate horizontal web 18 and there is a drainage space 20 between the floor 6 and the horizontal web 18.

One or more substantially horizontal troughs 22 extend above the filter bed 16 into the filter compartment 10 from the gullet 14 to distribute liquid into the filter compartment 10 from the gullet 14.

An effluent channel 24 is juxtaposed to the filter basin 4 and a conduit 26 connects the drainage space 20 to the effluent channel 24 for flow of liquid between them. Flow limiting means 28 (effluent resister) is associated with the conduit 26 to regulate the volume of liquid flowing through the conduit 26. The means 28 may, for example, be a section of smaller pipe, an orifice, a valve or equivalent closure device or it may be a siphon to serve the same purpose. The effluent restricter 28 is used to prevent an initial high flow rate through the filter bed 16.

There is a weir 30 in the effluent channel 24 that has a vertical height greater than the height of the trough 22 and less than the height of the walls 8 of the filter basin 4.

The influent channel 32 is juxtaposed to the filter basin 4 and is defined by a second floor 34 and sidewalls 36. A vertical transverse partition 38 is in the influent channel 32 of less height than the sidewalls 36 creating in the influent channel 32 an inlet water seal chamber 40.

A waste channel 42 is juxtaposed to the filter basin and is defined by a third floor 44 and sidewalls 46. There is a vertical overflow baffle 48 in the waste channel 42 that creates therein an exit water seal chamber 50.

A first siphon 52 that extends above the height of the walls 8 of the filter basin 4 has one end 54 extending into the inlet water seal chamber 40 and its other end 56 extends into the gullet 14.

A second siphon 58 that extends above the height of the walls 8 of the filter basin 4 has one end 60 that extends into the exit water seal chamber 50 and its other end 62 extends into the gullet 14.

A third siphon 64 that extends above the height of the weir 30 has one end 66 extending into the effluent channel 24 and its other end 68 is connected for flow of liquid from it into the drainage space 20.

Ports 70, 72 and 74 are in the three siphons 52, 58 and 64 respectively at approximately their highest point by which the siphons may be primed by application of vacuum to the ports from a suction device (not shown) or deactivated by opening of the ports.

The filter basin 4 and the channels 24, 32 and 42 may preferably be constructed with common walls as shown or they may be constructed as separate units (not shown) placed reasonably adjacent to one another. Also, the filter basin 4 can be used singly or a plurality (not shown) may be employed arranged in many configurations. The basin 4 is usually open at the top with the influent channel 32, effluent channel 24, waste channel 42 and gullet 14 all part of the same structure.

The underdrain web 18 may take many forms including a perforated pipe grid, but the preferred construction is a false floor made of individual blocks supported on legs. The block may have holes with suitable baffles or equipped with strainer nozzles. The drainage space 20 is provided under the false floor 18. The granular media filter bed 16 is placed over the underdrain 18.

During the filtering cycle (filter mode), the aqueous suspension to be filtered enters through influent channel 32 overflowing partition wall 38 filling the inlet water seal compartment 40 for the influent siphon 52, flows through siphon 52 which has been primed by applying suction to the port 70 and discharges into the gullet 14 which provides an output water seal for the siphon 52. The influent fills the gullet 14, flow into troughs 22 overflowing their edges and spilling into the filter compartment 10. During the filter mode, the liquid level will rise above the troughs 22 to a height required to establish flow through the filter bed 16. The liquid then passes through the underdrain 18, into and then out the drainage space 20, the conduit 26, the effluent restricter 28 into the channel 24. As the filtering continues, the liquid level in the effluent channel 24 rises, as does the liquid level in the filter compartment 10, until it reaches the edge of weir 30 and then overflows into an adjacent storage compartment or conduit (not shown). As suspended solids are trapped in the filter bed 16, they begin to plug the porous structure causing ever increasing resistance to fluid flow through the bed 16 resulting in an increase in liquid level in the filter compartment 10.

The backwash siphon 64 although connected to the effluent conduit 26 is not primed and therefore serves no function during the filter mode.

As suspended solids are removed and retained in the granular media bed 16 during the filter mode, the bed 16 becomes partially clogged causing an increase in pressure loss through the bed. When this pressure loss becomes greater than desired or when the bed 16 fails to retain suspended solids, the filter mode is ended and the trapped suspended material is removed from the bed by reverse flow of liquid (backwash mode) at a rate usually two to seven or eight times the rate of flow through the bed 16 during the filter mode.

The backwash mode is implemented by discontinuing the influent flow by venting siphon 52 to ambient through port 70. The liquid in filter compartment 10 will continue to flow through the bed 16 until its level in compartment 10 approaches the level of weir 30. At this level forward flow of liquid ceases and the reverse backwash flow is started by priming the waste siphon 58 via suction applied to port 72. As the liquid flows through siphon 58, the level in the waste channel 42 rises to the overflow baffle 48 which forms the exit seal 50 for the siphon 58 and the liquid level in compartment 10 drops until it reaches the level of the troughs 22. When the liquid level in gullet 14 drops below the level of weir 30, a reverse flow of liquid begins through the restricter 28, conduit 26, drain space 20, underdrain 18, up through the bed 16, overflowing into troughs 22, then into gullet 14 and into waste channel 42 via the siphon 58. This limited flow is supplemented by the use of the backwash siphon 64 to achieve a desired high backwash rate. Flow in the siphon 64 is started by applying suction to the port 74.

In certain instances, it may be beneficial during the backwash mode to use air to aid in cleaning the granular media filter bed 16 just before or during the backwash liquid flow. Air can be admitted below the underdrain 18 through connection 76 or through a distributors of various forms (not shown) located either below the underdrain 18 or positioned at some elevation in the filter bed 16.

When the granular media filter bed 16 is considered cleaned, the reverse flow of liquid is stopped by venting siphons 58 and 64 to ambient through the respective portion 72 and 74. Another filtration cycle can then be started by priming influent siphon 52 as previously described.

Figure 2:
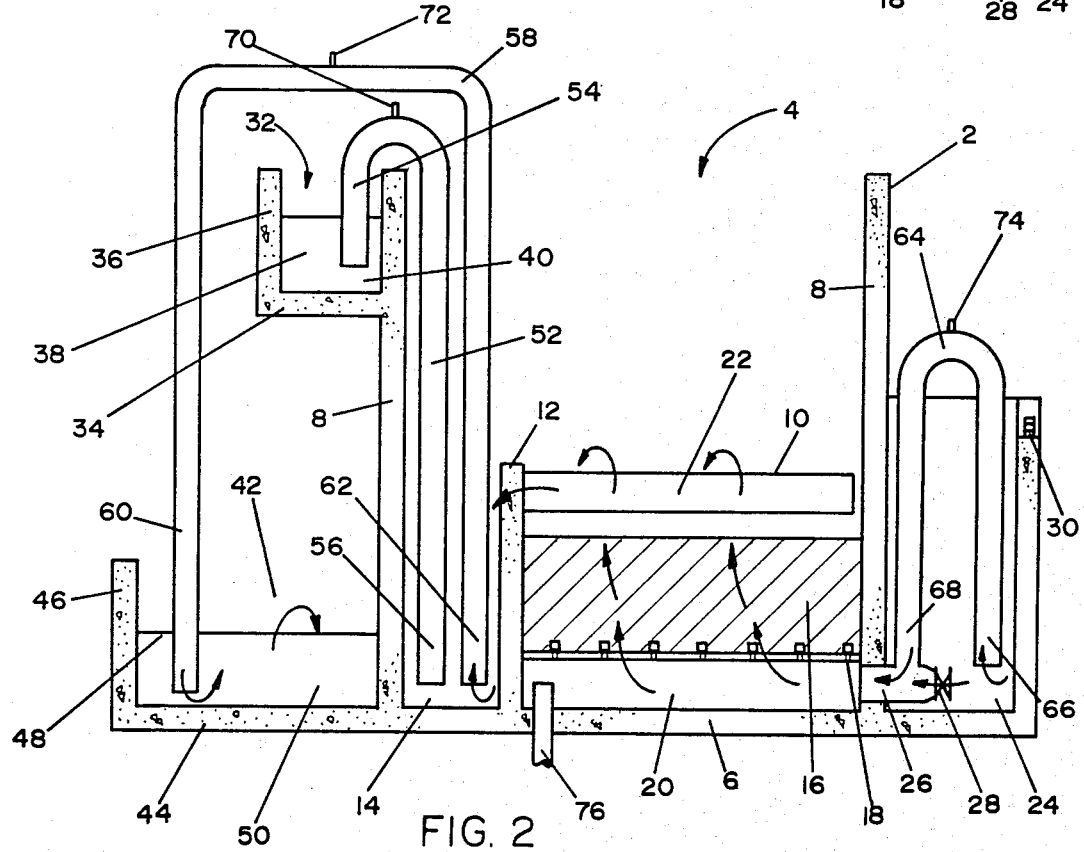
FIG. 2 is a lateral, sectional view of VDRF apparatus constructed in accordance with the invention operating in the backwash mode.
Figure 3:
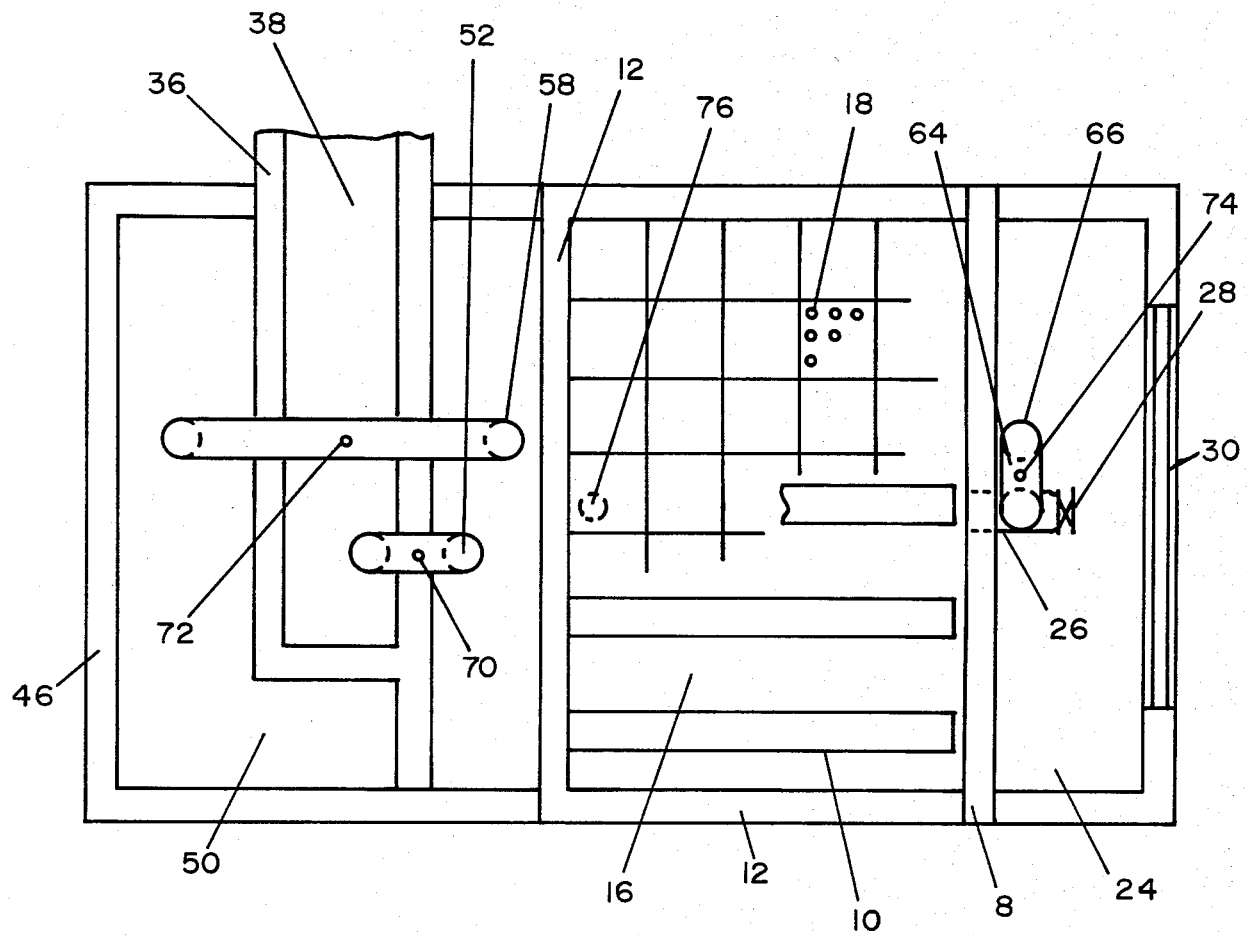
FIG. 3 is a plan view of the apparatus of FIG. 1.

The arrows in FIG. 1 indicate the direction of liquid flow during the filter mode of apparatus 2. The arrows in FIG. 2 indicate the direction of liquid flow during the backwash mode.

The embodiments of the invention in which an exclusive property or privilege is claimed are defined as follows:

1. An open gravity backwash filter comprising:
    an filter basin defined by a first floor and an enclosure wall that extends vertically upwardly from said floor,
    a filter compartment located within said filter basin defined along one side by a first vertical partition of less height than said wall and on the remaining sides by at least some of said enclosure wall of said filter basin,
    a gullet located within said filter basin juxtaposed to said filter compartment defined along one side by said vertical partition and on the remaining sides by at least some of said enclosure wall of said filter basin,
    a filter bed of particulate material supported in said filter compartment above said first floor on a perforate horizontal web,
    a drainage space between said first floor and said horizontal web,
    distribution means into said filter compartment from said gullet to distribute liquid to said filter compartment from said gullet,
    an effluent channel juxtaposed to said filter basin,
    a conduit connecting said drainage space to said effluent channel for flow of liquid between them,
    a weir in said effluent channel having a vertical height greater than the height of said distribution means and less than the height of said enclosure wall,
    an influent channel juxtaposed to said filter basin defined by a second floor and sidewalls,
    a vertical transverse partition in said influent channel of less height than said sidewalls of said influent channel creating in said influent channel an inlet water seal chamber,
    a waste channel juxtaposed to said filter basin defined by a third floor and sidewalls,
    a vertical overflow baffle in said waste channel that creates in said waste channel an exit water seal chamber,
    a first siphon that extends above the height of said enclosure wall of said filter basin, one end of said first siphon extending into said inlet water seal chamber and its other end extending into said gullet,
    a second siphon that extends above the height of said enclosure wall of said filter basin, one end of said second siphon extending into said exit water seal chamber and its other end extending into said gullet,
    a third siphon that extends above the height of said weir, one end of said third siphon extending into said effluent channel and its other end being connected for flow of liquid from it into said drainage space,
    ports in each of said siphons at approximately the highest point of each siphon by which the siphons may be primed by application of vacuum to said ports or deactivated by opening of said ports.

2. The open gravity backwash filter of claim 1 having flow limiting means associated with said conduit to regulate the volume of liquid flowing through said conduit.

3. The open gravity backwash filter of claim 1 having means to introduce liquid under pressure into said drainage space to assist in the backwashing of said filter bed.

4. The open gravity backwash filter of claim 1 wherein one sidewall of said effluent channel is also a wall of said filter basin.

5. The open gravity backwash filter of claim 1 wherein one sidewall of said waste channel is also a wall of said filter basin.

6. The open gravity backwash filter of claim 1 wherein one sidewall of said influent channel is also a wall of said filter basin.

7. An open gravity backwash filter comprising:
- a filter basin defined by a first floor and a plurality of walls of about the same height that extend vertically upwardly from said floor,
- a filter compartment located within said filter basin defined along one side by a first vertical partition of less height than said walls and on the remaining sides by some of said walls of said filter basin,
- a gullet located within said filter basin juxtaposed to said filter compartment defined along one side by said vertical partition and on the remaining sides by some of said walls of said filter basin,
- a filter bed of particulate material supported in said filter compartment above said first floor on a perforate horizontal web,
- a drainage space between said first floor and said horizontal web,
- distribution means extending above said filter bed into said filter compartment from said gullet to distribute liquid to said filter compartment from said gullet,
- an effluent channel,
- a conduit connecting said drainage space to said effluent channel for flow of liquid between them,
- flow limiting means associated with said conduit to regulate the volume of liquid flowing through said conduit,
- a weir in said effluent channel having a vertical height greater than the height of said distribution means and less than the height of said walls,
- an influent channel defined by a floor and sidewalls,
- a vertical transverse partition in said influent channel of less height than said influent channel sidewalls creating in said influent channel an inlet water seal chamber,
- a waste channel defined by a third floor and sidewalls,
- a vertical overflow baffle in said waste channel that creates in said waste channel an exit water seal chamber,
- a first siphon that extends above the height of said enclosure wall of said filter basin, one end of said first siphon extending into said inlet water seal chamber and its other end extending into said gullet,
- a second siphon that extends above the height of said enclosure wall of said filter basin, one end of said second siphon extending into said exit water seal chamber and its other end extending into said gullet,
- a third siphon that extends above the height of said weir, one end of said third siphon extending into said effluent channel and its other end being connected for flow of liquid from it into said drainage space,
- ports in each of said siphons at approximately the highest point of each siphon by which the siphons may be primed by application of vacuum to said ports or deactivated by opening of said ports.

8. In a method of removing suspended material from a aqueous suspension thereof by flowing in a filter mode said suspension from a gullet on to and through a filter bed of particulate material contained in a filter chamber to produce filtered effluent and in a backwash mode regeneration of said bed by backwashing said bed thereby producing waste effluent that is passed to a waste channel, the improvement which comprises:
- flowing said filtered effluent in said filter mode into an effulent channel,
- controlling the height of said filtered effluent in said effluent channel so that it is higher at the completion of said filter mode than the top of said filter bed,
- providing aqueous suspension to be filtered via an influent channel at a level above the top of said filter bed,
- siphoning during said filter mode aqueous suspension from said influent channel into said gullet,
- siphoning during said backwash mode filtered effluent from said effluent channel into said filter chamber beneath said filter bed, and
- siphoning during said backwash mode waste effluent from said gullet into said waste channel.

* * * * *